UNITED STATES PATENT OFFICE.

SAMUEL LEWIS SUMMERS, OF PHILADELPHIA, PENNSYLVANIA.

METHYLENE DISALICYLIC ACID AND PROCESS OF MAKING SAME.

SPECIFICATION forming part of Letters Patent No. 706,354, dated August 5, 1902.

Application filed April 26, 1902. Serial No. 104,821. (No specimens.)

*To all whom it may concern:*

Be it known that I, SAMUEL LEWIS SUMMERS, a citizen of the United States, and a resident of the city of Philadelphia, in the State of Pennsylvania, have invented and discovered a certain new and useful Methylene Disalicylic Acid and Process of Producing the Same, of which the following is a full, clear, and exact description.

My invention relates to the production of a new composition of matter in the class of organic chemical products; and it consists of a new methylene disalicylic acid having especial utility by reason of its therapeutic properties, and hence designed by me for use as a pharmaceutical product. Administered as an internal medicine in doses of from five to fifteen grains, varying according to condition of patient, it is a valuable remedy in cases of uric-acid diathesis.

My discovery comprehends not only the product as a new chemical individual, but a particular process which I have invented for the production of the same.

Salicylates and various compounds of salicylic acid, including crystalline derivatives resulting from the reaction of acetic and other acids thereon, have long been known and used; but it has not heretofore been proposed to produce a body containing two salicylic-acid molecules chemically held together, nor such chemically combined by the methylene group.

My new product consists of two salicylic-acid molecules $[C_6H_4(OH)COOH]_2$ united in a condensing reaction and by the reaction thereon of formaldehyde, (CHOH,) whereby one hydrogen atom in each of the salicylic-acid groups is removed and the formaldehyde deprived of its oxygen and leaving the methylene group, ($CH_2$,) the reaction forming a product which will be best understood by the following structural formula:

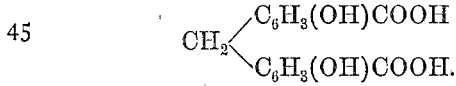

This product, after purification by washing and then drying, is a tasteless, creamy-white, impalpable powder of granular construction; melts at about 245° centigrade; its empirical formula is $C_{15}H_{12}O_6$, it is insoluble in water and benzene, hot or cold; slightly soluble in chloroform, and very soluble in ether and cold ethyl alcohol. It may be produced by my preferred process or the modified form thereof, the former as well as the latter of which I will now describe.

I dissolve twenty-four parts, by weight, of salicylic acid in about seven hundred and fifty parts boiling water, adding to the solution one hundred and fifty parts, by weight, of concentrated hydrochloric acid and twenty-five parts, by weight, of a forty-volume solution of formaldehyde in several successive portions, the solution being kept in a state of ebullition during the reaction. In about a half hour a heavy precipitate is formed, which is the methylene disalicylic acid. The mother-liquor is at once drawn off, and the precipitate is then washed with successive changes of boiling water until the wash-water is free from hydrochloric acid and unchanged salicylic acid, the latter being freely soluble, while my new product (the precipitate being washed) is perfectly insoluble in water either hot or cold.

A modification or, rather, another form of applying the hydrochloric acid and formaldehyde to react on the salicylic-acid solution consists in substituting for the water solution of the latter an ethyl-alcohol solution thereof and then passing hydrochloric and formaldehyde gases through the same in a suitable vessel.

Having thus described my invention, what I claim as new, and desire to secure by Letters Patent, is—

1. The new product described which is methylene disalicylic acid, a tasteless, impalpable creamy-white powder of granular construction, melting at 245° centigrade, having the empiric formula $C_{15}H_{12}O_6$ insoluble in water and benzol either hot or cold, slightly soluble in chloroform, and very soluble in ether and cold ethyl alcohol.

2. The process of producing methylene disalicylic acid which consists in heating to ebullition a saturated solution of salicylic acid to which has been added, in successive portions, concentrated hydrochloric acid and formaldehyde, then freeing the precipitate from all hydrochloric and unchanged salicylic acids by repeated washings in boiling water.

3. The process of producing methylene disalicylic acid by subjecting an alcoholic solution of salicylic acid to the action of hydrochloric and formaldehyde gases, in a suitable vessel, and then purifying the precipitate by washing in hot water.

In testimony whereof I have hereunto affixed my signature this 24th day of April, A. D. 1902.

SAMUEL LEWIS SUMMERS.

Witnesses:
GEO. W. REED,
H. T. FENTON.